(No Model.)
V. PLANCHON.
PHOTOGRAPHIC FILM.
No. 448,364. Patented Mar. 17, 1891.
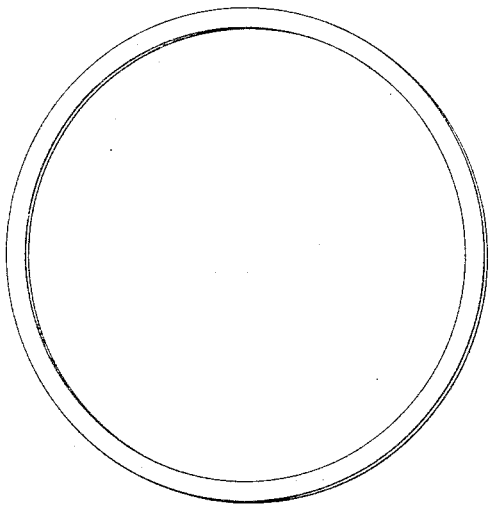
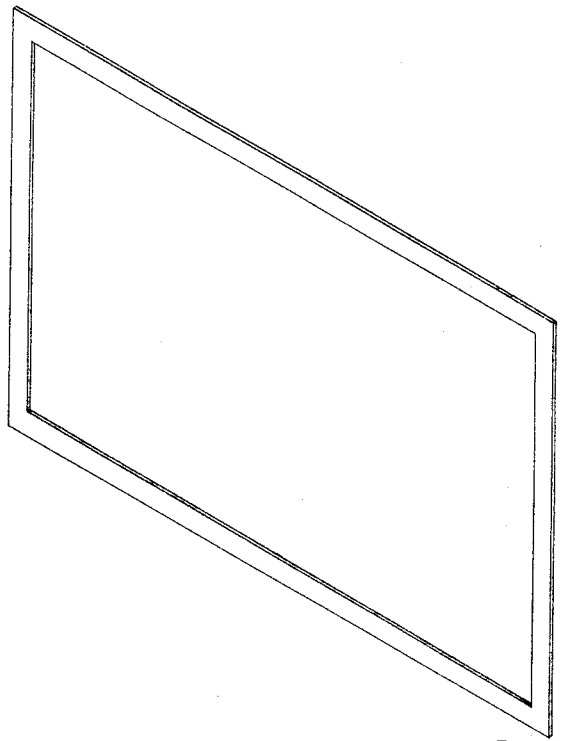
Witnesses
Ahran Macauly
E. D. Smith
Inventor
Victor Planchon,
By Church & Church
his Attys
THE NORRIS PETERS CO., PHOTO-LITHO., WASHINGTON, D. C.

UNITED STATES PATENT OFFICE.

VICTOR PLANCHON, OF BOULOGNE, FRANCE.

PHOTOGRAPHIC FILM.

SPECIFICATION forming part of Letters Patent No. 448,364, dated March 17, 1891.

Application filed September 17, 1890. Serial No. 365,216. (No model.) Patented in France July 8, 1890, No. 206,878.

*To all whom it may concern:*

Be it known that I, VICTOR PLANCHON, a citizen of the Republic of France, residing at Boulogne sur Mer, in the Republic of France, have invented certain new and useful Improvements in or Relating to Photographic Films, (for which I have made application for Letters Patent of France, No. 206,878, dated July 8, 1890,) of which the following is a specification.

This invention consists in connecting with the film at any desired period of its formation thin and narrow though rigid frames in such a manner that the film when completed is integral therewith, such frames serving not only as supports, but also as extenders or stretchers of the films. These frames may be either rectangular, as shown in the perspective view, Figure 1 of the accompanying drawings, or circular, as represented in Fig. 2, or elliptic, or, indeed, of any suitable shape or size, according to the nature and size of the cameras for which they are intended. They may also vary in thickness, and may have plane, round, or embossed surfaces, and, if necessary, slotted or perforated in certain parts. They may or may not be covered with suitable varnish or coating calculated to increase their power of adhesion to the films to prevent oxidation or other chemical alterations which may be caused by their contact with the chemicals employed for the films or by the different baths. I do not limit myself, moreover, to any particular mode of construction of my frames or to any special method of applying them to the films or to the use of any metal, alloy, or other rigid material for their manufacture. These frames are used, as before said, while the films are in course of preparation, no matter by what well-known process. The films are secured to them simply by contact, and either by pressure or by applying a suitable adhesive substance onto or between the different layers of ingredients of which the photographic film consists. These ingredients may be gelatine, cotton-powder, albumen, glycerine, varnish, or fatty or other translucid or transparent substances, whether or not they are liable to be modified by other physical or chemical agents or by light, and whether they are used singly or in conjunction with each other. The frames are applied before the evaporation or oxidation of the liquid or semi-liquid agents (water, alcohol, ether, oil, benzine, or other volatile and readily-drying substances) takes place, so that the materials mentioned in the preceding paragraph, being still moist, inflated, and glutinous, will exactly fit themselves to the shape of the frame-surfaces and insure perfect adhesion, and the complete film may thus be made to adhere to one side of the frame only, or the frame may be interposed between two successive layers of the materials composing the films.

The practical operation of the frames may be described by the following instance, to the particulars of which, however, I do not confine my claim: Upon a smooth plate of any description, treated with talc, collodion, wax, silicate, &c., the materials which are to form the photographic film are spread by either mechanical or other means. Then, before the solvents employed are wholly evaporated or while the materials forming the film are yet in an inflated, humid, or semi-liquid condition, my improved frames are applied thereto and secured in the manner indicated above. When the film is quite dry, it remains attached to the frame, partaking of its rigidity and plane. The films thus directly stretched and supported are of very little weight and volume, and may be manipulated during the different stages of the photographic process (taking the impression, developing, fixing, &c.) as readily as ordinary glass or other plates.

I claim—

1. The herein-described method of applying stretchers or frames to photographic films, consisting in incorporating them with the films before the films are dry or while the materials forming the film are in an inflated, humid, or semi-liquid condition, substantially as described.

2. As an improved article of manufacture, a photographic film having a relatively rigid frame or stretcher incorporated therein, substantially as described.

3. As an improved article of manufacture, a photographic film having a relatively rigid frame or stretcher incorporated therein between the successive layers of film, substantially as described.

In testimony whereof I have hereunto subscribed my name in the presence of the two subscribing witnesses.

VICTOR PLANCHON.

Witnesses:
L. COURNON,
GROS. MOULU.